United States Patent [19]

Zwingl et al.

[11] 4,342,785

[45] Aug. 3, 1982

[54] PROCESS FOR MATURING LEAVEN

[75] Inventors: Johann Zwingl, Vienna; Heinrich Heckmann, Baden, both of Austria

[73] Assignee: Vereinigte Nahrungsmittel-industrie Aktiengesellschaft, Vienna, Austria

[21] Appl. No.: 130,966

[22] Filed: Mar. 17, 1980

[30] Foreign Application Priority Data

Mar. 22, 1979 [AT] Austria ................................ 2143/79

[51] Int. Cl.[3] ................................................ A21D 8/00

[52] U.S. Cl. ........................................ 426/19; 426/62

[58] Field of Search ....................... 426/18, 19, 27, 62; 435/287, 3, 289, 290, 800

[56] References Cited

U.S. PATENT DOCUMENTS 3,620,173 11/1971 Sternberg ............................ 426/18

*Primary Examiner*—Raymond N. Jones

*Assistant Examiner*—Elizabeth A. Hatcher

*Attorney, Agent, or Firm*—Townsend and Townsend

[57] ABSTRACT

The invention relates to a process for maturing leaven for bread making, comprising the steps of conveying the leaven in the form of a dough strand by means of pump pressure through an elongated, essentially closed, tubular cavity, of completely filling out said cavity with said leaven and of fermenting said leaven in said tubular cavity.

14 Claims, 2 Drawing Figures

PROCESS FOR MATURING LEAVEN

The invention relates to a process for maturing leaven for bread making.

The invention further relates to a device for carrying out the process.

The making of high-quality bread containing rye flour is only possible by means of leaven, even at the present stage of bakery science. Leaven is understood to mean a dough prepared from rye flour and water which dough is modified in a characteristic manner by biochemical reaction processes involving homofermentative and heterofermentative lactic acid bacteria and leaven yeast. These fermentation organisms are transferred to a freshly prepared rye dough by the addition of mature, i.e. adequately fermented, leaven shares or by inoculation with pure cultures. Continuation up to the required amounts is in each case done by mixing mature leaven with flour and water.

Within the meaning of classical teaching, leaven has three functions:

(a) The formation of acids: mainly formed are lactic acid and acetic acid. The ratio of the two acids depends upon the working of the leaven, essentially meaning its temperature, consistency (ratio flour to water) and—of little importance concerning the acid ratio—the fermentation time. The acids formed contribute to keeping the effect of starch-degrading enzymes in the bread dough within the desired limits, so that rye flour and dough prepared from it become fit for baking. The balanced ratio of lactic acid to acetic acid, which normally ranges from 65:35 to 80:20, determines the taste of the bread, among other things.

(b) The formation of carbon-dioxide-producing organisms, "rising efficiency". The $CO_2$ formed mainly by the fermentation of yeast effects the loosening of the bread mass.

(c) The formation of aromatic substances: aromatic substances such as esters and aldehydes which make up an essential contribution to the total impression of the taste of the bread are obtained as by-products of lactic acid fermentation and the fermentation of yeast.

The classical working of leaven consists of three to four phases. The three aims indicated above are reached by an empirically determined change of temperature and consistency in the individual stages of leaven preparation. This working in three or four phases requires a considerable investment of time and labor. It further has the disadvantage that working over extended periods of production standstill, such as weekends or holidays, requires specific measures to maintain the viability of the fermentation organisms.

During the past decades, attempts have been made to rationalize and streamline the working of leaven, as this is the vital prerequisite for mechanization and trouble free handling during production standstill. The following are examples of some of the processes which have been developed:

Basic leavening with or without full leavening phase (one or two phase process).

Detmold one phase process.

Berlin quick-leavening process (one phase).

Salt leavening process (one phase).

Although these processes were simplified and partially suitable for mechanization, they had the disadvantage that they could no longer fully meet the three requirements indicated under (a), (b) and (c) above. Above all, the development of leaven yeast was almost completely inhibited, so that considerable amounts of dry yeast had to be added to the dough. In some of these processes, the formation of acid no longer occurred in the amounts required for baking, so that additional leavening had to be added.

Aside from the increased raw material costs caused by this, some types of working had disadvantages in respect of quality, as an unbalanced ratio of lactic acid to acetic acid prevailed and changed the taste of the bread by influencing the formation of aromatic substances. Moreover, the quality of the leaven was not always uniform and acceptable after extended production standstills.

In a known process, a conveyor screw is provided for conveying the dough in the tubular penary fermentation space. No cooling means for controlling the biological process is provided. The use of a conveyor screw is limited, in particular in case of long fermentation tubes. Moreover, the tube cannot be provided in space-saving forms such as loops or coils (U.S. Pat. No. 3,620,173).

It is known from a different context to convey the dough through the interior of the shell of a continuous kneader. The essential feature of a kneader is that mixing and kneading elements effecting the mixing of the ingredients and the kneading of the dough are provided on a rotating shaft arranged in longitudinal direction of the tubular shell. At the same time, the rotating motion of the radially attached elements effects conveyance of the dough to the outlet of the kneader. It is not the primary purpose of a continuous kneader, however, to initiate fermentation or dough maturing processes. (U.S. Pat. No. 3,694,227).

Further embodiments in which the dough is conveyed through tubes, but wherein no maturing of the leaven takes place, are also known (U.S. Pat. No. 3,819,837, Austrian Patent Specification No. 248 985).

It is the object of the invention to eliminate the disadvantages mentioned above.

The process according to the invention comprises the steps of conveying the leaven in the form of a dough strand by means of pump pressure through an elongated, essentially closed, tubular cavity, of completely filling out said cavity with said leaven and of fermenting said leaven in said cavity.

The invention further comprises the step of cooling said leaven during its passage through the cavity over at least one portion of its length.

According to the invention, it is possible to put the available space to optimum use by providing coiled or bent tubes and to control the biological process. The invention further allows for the compensation of minor fluctuations in the degree of maturity of the leaven in the first stage caused by different maturing periods with or without cooling.

The process according to the invention does not require manual interference. The three requirements of acid formation, rising efficiency and the formation of aromatic substances are fully met just like in a leaven prepared in a classical three to four stage process. For this reason, the supplementary addition of yeast and/or leavening is not necessary. The process assures the full maintenance of the viability of the fermentation organisms over weekends and holidays. This is achieved by cooling the leaven in the first stage by lowering the temperature without changing the leaven in respect of its flour-water ratio. The working of the leaven can be so arranged that all steps can be carried out by means of a programmed circuit. As the tube is constantly filled up, no cleaning of the fermentation vessel during the first stage is necessary. The biological processes can be slowed down or halted as required by cooling. It is of advantage to dilute the leaven after it passed the elongated tubular cavity and to use it for bread making immediately afterwards. Due to its state of full maturity, the leaven thus diluted is immediately available for bread making after the first stage without having to pass through the second stage of the fermentation vessel. This constitutes an exceptional case, as in conventional practice, the leaven has to pass a second stage.

According to a development of the invention, the leaven is used in the first stage of the process in a ratio of flour to water of 1:1, while the flour-water ratio in the second stage is 1:1.5, which facilitates metering of the leaven in the subsequent bread making.

It is also possible to change the mixing ratio of the leaven, i.e. the ratio of mature leaven to fresh rye flour dough. This results in a slower maturing during the first stage due to a lower starting number of fermentation organisms. The conventional mixing ratio of 1:1 is then preferably replaced by a ratio of 1:9.

The preferred device for maturing leaven for bread making comprises an elongated, essentially closed, tubular fermentation vessel and a pump for conveying the leaven through said vessel by means of pump pressure.

It is of advantage in this to provide the cooling means in the form of a second tube coaxially inserted into the tube serving as a fermentation vessel and preferably subdivided into portions.

It is of further advantage that the ratio of diameter to length of the tube be at least 1:10, preferably 1:30, in particular 1:100 to 1:300.

The invention is described in detail under reference to the drawing showing an embodiment of a device according to the invention with one variant.

Figures 1, 2:
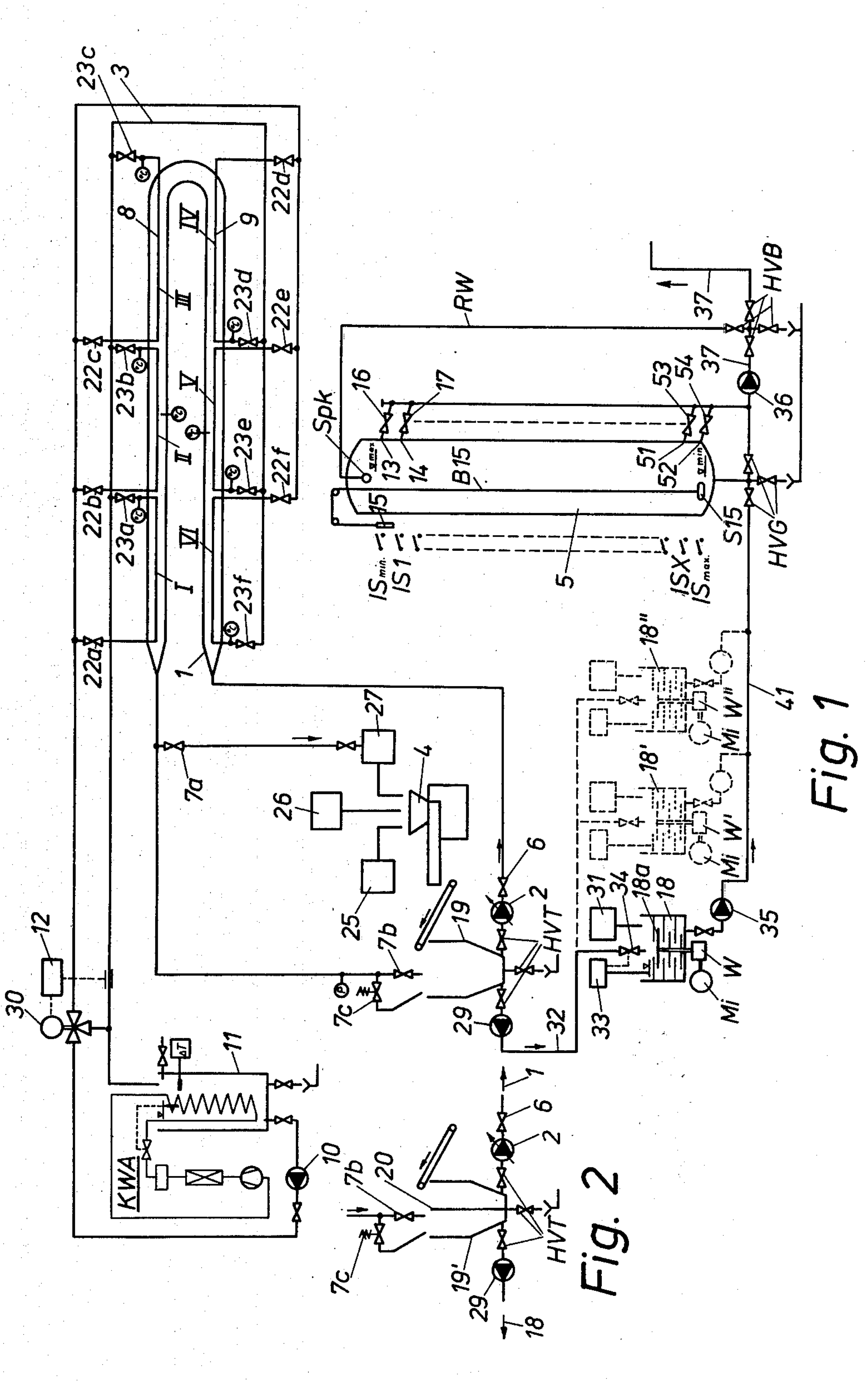
FIG. 1 shows a schematic view of the device according to the invention.
FIG. 2 shows a variant of the mixing container used therein.

The device illustrated in FIG. 1 is intended for a two-stage process. It essentially comprises a non-linear tube 1 for example, a tube having a U-shape and serving as a fermentation vessel for the first stage of the process so that the leaven can move through the tube along a non-linear path. Immature leaven is conveyed to tube 1 by means of a dough pump 2 from a mixing vessel 19. Tube 1 is provided over its entire length over portions with a cooling means 3. The device further comprises a kneader 4 arranged on the discharge end of tube 1 and fed by a water metering means 25, a flour metering means 26 and a leaven metering means 27, and a fermentation vessel 5 for the second stage of the process.

The tube 1 is made of stainless steel and can be closed on its inlet side by means of valve 6 and on its outlet side by means of valves *7a, 7b and 7c. 7c* is a safety valve.

The dough pump 2 is a disk piston pump or vane-type pump with variable speed drive whose efficiency is adjusted to the static load, to friction losses and to the counter pressure of the fermentation gases.

The cooling means 3 supplied by the cooling water plant KWA has the form of a tube cooler and consists of a second tube 8, 9 inserted into tube 1 and coaxially extending thereto, the cooling water flowing through tube 8, 9. The water circulation is maintained by means of a circulating pump 10. A heat exchanger 11 and a temperature control 12 coupled with control valve 30 are provided in the water circuit and assure the adjustment of the desired temperature. The tubes 8, 9 are subdivided into portions I, II, III, IV, V, VI. This subdivision into portions permits a cooling in portions by means of valves *22a, 23a, 22b, 23b, 22c, 23c, 22d, 23d, 22e, 23e, 22f, 23f,* which may be used for controling the cooling process in addition to regulation of the temperature. Thermometers are provided at the individual portions of the cooling means 3.

Conveying of the leaven and circulation in the tube system of the first stage is effected by the dough pump 2.

The volume of the leaven discharged from tube 1 of the first stage of the process is increased in the kneader 4 by continuous kneading with flour and water at a ratio of 1:1. Half of this freshly prepared dough batch is returned to the tube circuit, the other half is pumped by means of a pump 29 to the mixer 18 and then homogenized in the mixer after addition of 25% water from a water metering means 31. A valve 34 controlled by a level gauge 33 is arranged at the end of conduit 32 containing the pump 29. The rotor 18*a* of the mixer 18 is driven via a motor Mi and an angle drive W. For larger volumes of leaven production, further mixers 18', 18" with angle drives W' and W" can be provided.

The homogenized leaven slurry is now fed via a distributing system consisting of a feed line 41 and hand valves HVG and supplied by pump 35 from below into fermentation vessel 5 and from there via a line 37 containing a pump 36 to the means for bread making. The leaven rises in the fermentation vessel in layers during a maturing period of three hours. Feeding according to requirements can be automatized by means of a time-programmed control device.

The fermentation vessel 5 is provided at regular lateral spaces with outlets 13, 14, 51, 52 whose number depends on the dimensions of the vessel. The topmost layer of leaven, having fermented for three hours, is withdrawn through the lateral outlets arranged on the same level. The outlets 13, 14, 51, 52 are closed or opened by means of pneumatically controlled valves 16, 17 and 53, 54. Control of the valves is effected by means of end switches IS1, IS2 and ISx−1 actuable by means of a level gauge 15 connected via cable B15 to a float S15 centrally guided in the fermentation vessel 5. IS max=overfilling safety, IS min.=signal for emptying. The direction of the leaven or cleaning water stream can be controlled by means of the hand valves HVG provided below the fermentation vessel 5. This also applies to the valves HVB behind the pump 36. Cleaning water circulation is effected via line RW and the spraying head Spk arranged in the top part of the fermentation vessel.

In addition to cooling during extended periods of of standstill (35 to 40 hours), the mixing ratio, i.e. the ratio of mature leaven to fresh rye flour dough, can be changed in the first stage of the process.

In this case, the mixing ratio of 1:1 is changed by supplying the continuous kneader 4 by means of the valves 7*a* and 7*b* with a reduced amount of leaven (preferably 10 percent of the normal amount, which corresponds to a mixing ratio of 1:9). The now remaining increased amount of mature leaven (preferably 90 percent) is directly supplied to the slurry mixers and homogenized, as shown in FIG. 2. The leaven in form of a slurry is now available for bread making without having to pass the vessel. In this means, the vessel 19' is provided with an, optionally insertable, separating wall 20. The discharge lines of the mixing vessels 19, 19' can be locked individually by means of hand valves HVT.

By means of this device, control of the biological fermentation process is possible and a continuous production without noticeable change in taste or rising efficiency of the natural leaven yeast is assured.

Length and volume of the tube depend upon the amount of leaven required. In the course of a continuous production extending over several days, a completely normal fermentation takes place.

At production standstill, the cooling method can be employed.

What we claim is:

1. A staged process for maturing leaven for bread-making comprising in a first stage the steps of pressurizing immature leaven, introducing the pressurized leaven in the form of a dough strand into an elongated, essentially closed, tubular cavity, completely filling the cavity with the leaven, fermenting the leaven in the tubular cavity, cooling the matured leaven during its passage through the cavity as the matured leaven passes at least one portion of the cavity length, and in a second stage comprising the step of further fermenting the matured leaven.

2. A process according to claim 1, wherein, in the first stage of the process, the ratio of flour to water is 1:1 and, in the second stage of the process; the ratio of flour to water is 1:1.5.

3. A process according to claim 1, including the steps of changing the mixing ratio of mature leaven to flour and water from 1:1 to 1:9.

4. A process for maturing leaven for bread-making comprising the steps of: preparing fresh leaven including flour, water and a fermentation agent; introducing the fresh leaven into a long, tubular cavity at an intake end thereof; pressurizing the fresh leaven at the intake end so that the pressure causes the leaven to completely fill the cavity and to move through the cavity to an outlet thereof; maintaining the leaven in the cavity for a sufficient length of time to effect the fermentation of the leaven therein and thereby form mature leaven; withdrawing mature leaven from the outlet of the cavity; and regulating the fermentation rate of the leaven in the cavity by changing the temperature of the leaven over at least a portion of the length of the cavity.

5. A process according to claim 4 wherein the step of changing the temperature comprises the step of directing a cooling agent centrally of the leaven disposed in the cavity over the portion of the length thereof.

6. A process according to claim 5 wherein the step of directing the cooling agent comprises the step of directing a plurality of independent streams of the cooling agents over a like plurality of serially arranged portions of the length of the cavity.

7. A method according to claim 6 including the step of independently regulating the plurality of cooling agent streams.

8. A process according to claim 4 wherein the cavity is non-linear, and including the step of moving the leaven through the cavity along a non-linear path.

9. A process according to claim 4 further comprising the step of introducing fresh leaven at about the rate at which mature leaven is withdrawn from the outlet of the cavity, wherein said fresh leaven is formed by combining a portion of the matured leaven with a mixture of fresh flour and water.

10. A process according to claim 4 wherein the step of regulating the fermentation rate of the leaven in the cavity comprises the step of changing the mixing ratio of flour and water to about 1:9.

11. A process for maturing leaven for bread making comprising the steps of: preparing fresh leaven by mixing flour, water and mature leaven; introducing the fresh leaven into a relatively long, tubular cavity at an intake end thereof; pressurizing the leaven at the intake end so that the pressure causes the leaven to completely fill the cavity and to move through the cavity to an outlet thereof; maintaining the leaven in the cavity for a sufficient length of time to effect the fermentation of the leaven therein and thereby form mature leaven; withdrawing mature leaven from the outlet of the cavity; and regulating the fermentation rate of the leaven in the cavity by changing at least one of the temperature of the leaven over at least a portion of the length of the cavity and, during the preparing step, the ratio of mature leaven to flour and water over a range of between about 1:1 to about 1:9.

12. A staged process for maturing leaven for bread-making comprising in a first stage the steps of pressurizing immature leaven, introducing the pressurized leaven in the form of a dough strand into an elongated, essentially closed, tubular cavity, completely filling the cavity with the leaven, fermenting the leaven in the tubular cavity during its passage therethrough to form a mature leaven, cooling the mature leaven during its passage through the cavity as the mature leaven passes at least one portion of the cavity length, and in a second stage comprising the steps of mixing the mature leaven with fresh flour and water and, thereafter, further fermenting the mixture of mature leaven, fresh flour and water.

13. A process for maturing leaven for bread-making comprising the steps of: preparing fresh leaven including flour, water and mature leaven as a fermentation agent; introducing the fresh leaven into a long, tubular cavity at an intake end thereof; pressurizing the fresh leaven at the intake end so that the pressure causes the leaven to completely fill the cavity and to move through the cavity to an outlet thereof; maintaining the leaven during its passage in the cavity for a sufficient length of time to effect the fermentation of the leaven therein and thereby form a mature leaven; withdrawing mature leaven from the outlet end of the cavity; and regulating the fermentation rate of the fresh leaven in the cavity by changing the temperature of the leaven in the cavity over at least a portion of the length of the cavity.

14. A process according to claim 13, further comprising the step of introducing fresh leaven at about the rate and volume at which mature leaven is withdrawn from the outlet of the cavity, and wherein the immature leaven is prepared by combining a portion of the matured leaven with a mixture of fresh flour and water.

* * * * *